(12) United States Patent
Stoebe et al.

(10) Patent No.: US 9,123,366 B2
(45) Date of Patent: Sep. 1, 2015

(54) DISC DRIVE WITH MAGNETIC SELF-ASSEMBLED MONOLAYER

(71) Applicant: Seagate Technology LLC, Cupertino, CA (US)

(72) Inventors: Timothy W. Stoebe, Minnetonka, MN (US); David J. Ellison, Minneapolis, MN (US)

(73) Assignee: Seagate Technology LLC, Cupertino, CA (US)

( * ) Notice: Subject to any disclaimer, the term of this patent is extended or adjusted under 35 U.S.C. 154(b) by 9 days.

(21) Appl. No.: 13/929,388

(22) Filed: Jun. 27, 2013

(65) Prior Publication Data

US 2015/0002960 A1    Jan. 1, 2015

(51) Int. Cl.
  *G11B 5/82*    (2006.01)
  *G11B 5/48*    (2006.01)
  *G11B 5/31*    (2006.01)

(52) U.S. Cl.
  CPC .............. *G11B 5/4813* (2013.01); *G11B 5/314* (2013.01)

(58) Field of Classification Search
  CPC . G11B 5/314; G11B 2005/0021; G11B 5/855
  USPC ............ 428/64.1, 64.2, 828–830, 831–832.4, 428/848–848.8; 360/135, 235.4–237.1
  See application file for complete search history.

(56) References Cited

U.S. PATENT DOCUMENTS

| | | | |
|---|---|---|---|
| 6,747,841 B1 | 6/2004 | Olim | |
| 7,327,535 B2 * | 2/2008 | Feng et al. | 360/235.4 |
| 7,656,619 B1 | 2/2010 | Yan | |
| 7,675,711 B2 | 3/2010 | Feng et al. | |
| 7,746,600 B2 | 6/2010 | Hancer et al. | |
| 7,855,858 B2 | 12/2010 | Hancer et al. | |
| 8,114,470 B2 | 2/2012 | Gao et al. | |
| 2003/0169618 A1 * | 9/2003 | Lindsey et al. | 365/151 |
| 2004/0223256 A1 * | 11/2004 | Feng et al. | 360/122 |
| 2005/0048691 A1 * | 3/2005 | Bocian et al. | 438/99 |
| 2006/0177570 A1 * | 8/2006 | Feng et al. | 427/127 |
| 2007/0042154 A1 | 2/2007 | Hancer et al. | |
| 2007/0196673 A1 * | 8/2007 | Hancer et al. | 428/447 |
| 2008/0204938 A1 | 8/2008 | Hirata | |
| 2011/0205665 A1 * | 8/2011 | Jones et al. | 360/110 |
| 2012/0052329 A1 * | 3/2012 | Gao et al. | 428/827 |
| 2013/0084468 A1 * | 4/2013 | Albrecht et al. | 428/836 |
| 2013/0128385 A1 | 5/2013 | Karr et al. | |

OTHER PUBLICATIONS

B.D. Terris and T. Thomson, "Nanofabricated and self-assembled magnetic structures as data storage media", Institute of Physics Publishing, Journal of Physics D: Applied Physics 38 (2005) R199-R222.

(Continued)

*Primary Examiner* — Adam B Dravininkas
(74) *Attorney, Agent, or Firm* — HolzerIPLaw, PC

(57) ABSTRACT

A magnetic data storage drive that includes a self-assembled monolayer having a magnetic function. The drive comprises a magnetic data storage medium having a magnetic surface, a slider having a working surface, the slider positioned and configured to detect magnetic fields from the magnetic surface of the medium, and a self-assembled monolayer between the magnetic surface and the working surface, the self-assembled monolayer having a magnetic function to reduce dispersion of magnetic fields from the magnetic surface of the medium to the working surface of the slider.

17 Claims, 5 Drawing Sheets

(56) References Cited

OTHER PUBLICATIONS

S.N. Ahmad et al., "Tuning morphology and magnetic properties of sputter permalloy by organic underlayers," Appl. Phys. Lett. 92, 112511 (2008).

T.C. Kreutz et al., "Modification of ferromagnetism in semiconductors by molecular monolayers," Appl. Phys. Letters, vol. 83, No. 20, pp. 4211-4213 (2003).

M. Lyons et al., "Magnetic Field Effects in Ferrocenealkane Thiol Self Assembled Monolayer Modified Electrodes," Int. J. Electrochem. Sci. 5, 1310-1341 (2010).

* cited by examiner

DISC DRIVE WITH MAGNETIC SELF-ASSEMBLED MONOLAYER

BACKGROUND

Hard disc drives are common information storage devices having of a series of rotatable disks that are accessed by magnetic reading and writing elements. These data transferring elements, commonly known as transducers or heads, are typically carried by and embedded in a slider body that is held in a close relative position over discrete data tracks formed on a disc to permit a read or write operation to be carried out. In order to properly position the transducer with respect to the disc surface, an air bearing surface (ABS) formed on the slider body experiences a fluid air flow that provides sufficient lift force to "fly" the slider and transducer above the rotating disc data tracks.

Some of the major objectives in disc drive designs are to fly the slider and its accompanying transducer as close as possible to the surface of the rotating disk. The height or separation gap between the slider and the spinning magnetic disc is commonly defined as the "flying height". The flying height of the slider is viewed as one of the most critical parameters affecting the magnetic disc reading and recording capabilities of a mounted read/write element. A relatively small flying height allows the transducer to achieve greater resolution between different data bit locations on the disc surface, thus improving data density and storage capacity. With the increasing popularity of lightweight and compact notebook type computers that utilize relatively small yet powerful disc drives, the need for a progressively higher data density and storage capacity has continually grown.

SUMMARY

The present disclosure provides a disc drive with increased areal density and magnetic recording capability.

One particular embodiment of this disclosure is a magnetic data storage drive. The drive comprises a magnetic data storage medium having a magnetic surface, a slider having a working surface, the slider positioned and configured to detect magnetic fields from the magnetic surface of the medium, and a self-assembled monolayer between the magnetic surface and the working surface, the self-assembled monolayer having a magnetic function to reduce dispersion of magnetic fields from the magnetic surface of the medium to the working surface of the slider.

Another particular embodiment of this disclosure is a magnetic data storage drive that has a magnetic data storage medium and a slider. The storage medium comprises a magnetic surface, a protective overcoat present on the magnetic surface, and a self-assembled monolayer comprising a ferrocene on the protective overcoat. The slider comprises a working surface, a second protective overcoat present on the working surface, and a second self-assembled monolayer comprising a ferrocene on the second protective overcoat.

Yet another particular embodiment of this disclosure is a system that has a device and a magnetic media. The device includes a magnetic write transducer having an air bearing surface (ABS) and a self-assembled monolayer coating on the transducer, the self-assembled monolayer having a magnetic moment. The magnetic media includes a second self-assembled monolayer coating having a magnetic moment.

These and various other features and advantages will be apparent from a reading of the following detailed description.

BRIEF DESCRIPTION OF THE DRAWING

The disclosure may be more completely understood in consideration of the following detailed description of various embodiments of the disclosure in connection with the accompanying drawing, in which.

DETAILED DESCRIPTION

The present embodiments are directed to magnetic data storage devices, also known as disc drives. In general, the present disclosure is directed to a self-assembled monolayer present on the magnetic data storage medium and/or on the magnetic recording and read head (also referred to as the slider) of the disc drive. The self-assembled monolayer has a magnetic function that channels or directs magnetic fields, thus reducing the dispersion of the magnetic field from the storage medium and the read head, and increasing the effective spacing between the medium and the head (i.e., the head to media spacing (HMS)). In some embodiments, the self-assembled monolayer is covalently bonded to a protective overcoat present on the storage medium and/or the slider. The disclosure also presents a method for directly depositing the monolayer onto the surface of the element.

In the following description, reference is made to the accompanying drawing that forms a part hereof and in which are shown by way of illustration at least one specific embodiment. The following description provides additional specific embodiments. It is to be understood that other embodiments are contemplated and may be made without departing from the scope or spirit of the present disclosure. The following detailed description, therefore, is not to be taken in a limiting sense. While the present disclosure is not so limited, an appreciation of various aspects of the disclosure will be gained through the discussion provided below.

Unless otherwise indicated, all numbers expressing feature sizes, amounts, and physical properties are to be understood as being modified by the term "about," whether or not the term "about" is immediately present. Accordingly, unless indicated to the contrary, the numerical parameters set forth are approximations that can vary depending upon the desired properties sought to be obtained by those skilled in the art utilizing the teachings disclosed herein.

As used herein, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower", "upper", "beneath", "below", "above", "on top", etc., if used herein, are utilized for ease of description to describe spatial relationships of an element(s) to another. Such spatially related terms encompass different orientations of the device in addition to the particular orientations depicted in the figures and described herein. For example, if a structure depicted in the figures is turned over or flipped over, portions previously described as below or beneath other elements would then be above those other elements.

Figure 1:
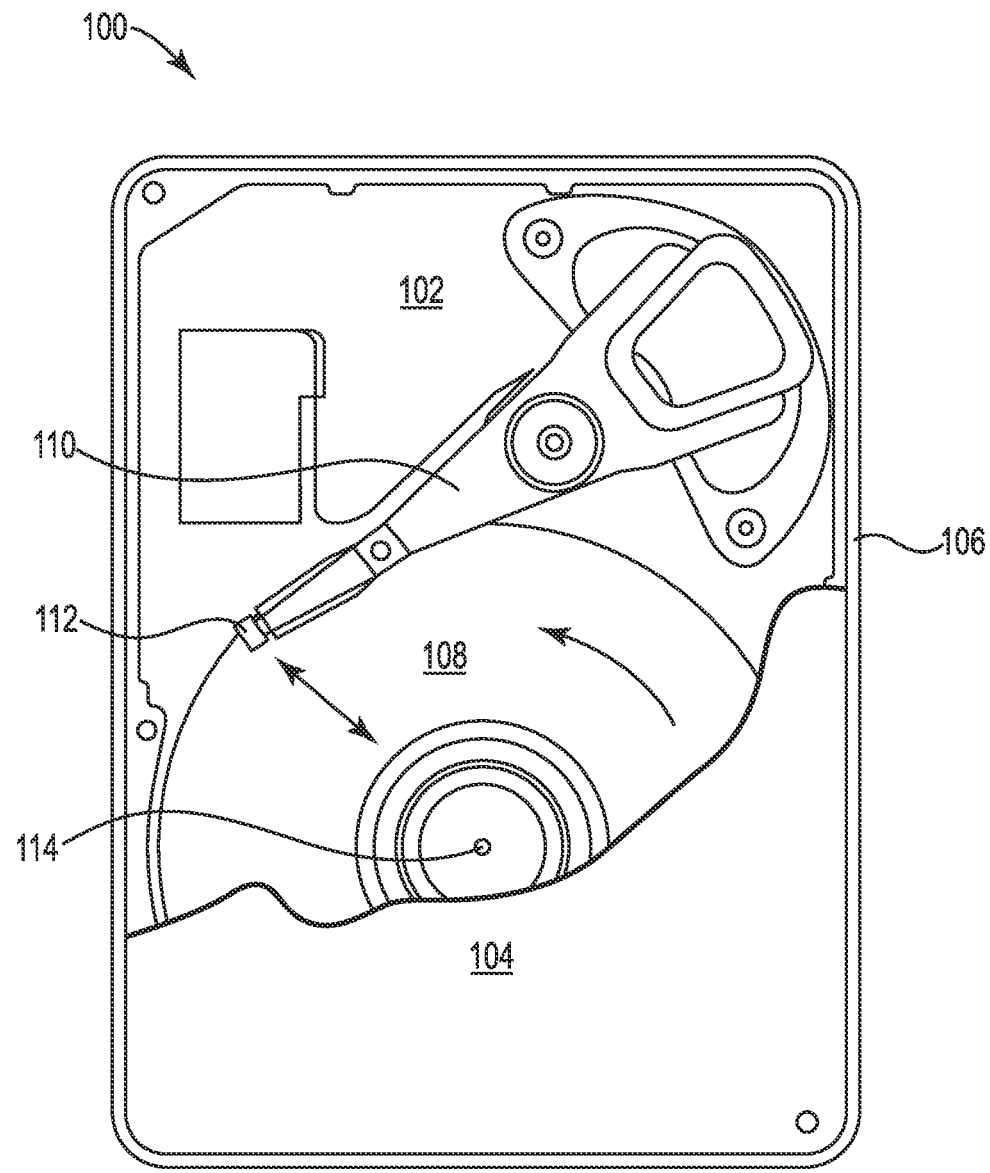
FIG. 1 is a top view of a hard disc drive.

Referring to FIG. 1, an exemplary magnetic disc drive 100 is schematically illustrated. Disc drive 100 includes a base 102 and a top cover 104, shown partially cut away. Base 102 combines with top cover 104 to form a housing 106, in which is located one or more rotatable magnetic data storage media or discs 108. Magnetic storage media 108 are attached to spindle 114 for co-rotation about a central axis. It should be noted that a pack of multiple discs or media 108 is utilized in some embodiments, and only a single disc or medium 108 is used in other embodiments. Each disc or medium surface has an associated head or slider 112 which is mounted adjacent to and in communication with its corresponding disc or medium 108. Head or slider 112 includes a data reading transducer (also referred to as a read head) and a data recording transducer (also referred to as a write head), which read and write data to storage disc or medium 108. In the example shown in FIG. 1, head or slider 112 is supported by an actuator assembly 110, composed of various elements that are known in the field of disc drives. The actuator assembly 110 shown in FIG. 1 is of the type known as a rotary moving coil actuator and includes a voice coil motor to rotate actuator assembly 110 with its attached slider 112 to position slider 112 and its read/write heads over a desired data track along an arcuate path between an inner diameter and an outer diameter of disc or medium 108.

Magnetic storage medium 108 stores information as magnetically oriented bits in a magnetic recording layer. The data recording transducer (write head) generates magnetic fields sufficient to magnetize discrete domains of magnetic storage medium 108. These discrete domains of the magnetic film each represent a bit of data, with one magnetic orientation representing a "0" and a substantially opposite magnetic orientation representing a "1." The data reading transducer (read head) of slider 112 is capable of detecting the magnetic fields of the discrete magnetic domains of the magnetic film.

Slider 112 may include a protective overcoat over various features of slider 112, such as the read head, the write head, the air bearing surface (ABS) or rails, and/or an advanced air bearing (AAB) surface. Additionally or alternately, storage medium 108 may include a protective overcoat. The protective overcoat may be, for example, diamond-like carbon (DLC), which has a crystal lattice similar to diamond, or an amorphous carbon layer. In some embodiments, the protective overcoat may have a {100} crystal plane. The protective overcoat is typically a continuous and non-interrupted layer, devoid of pinholes or other flaws in the coating, having a thickness of at least 30 Angstroms, in some embodiments at least 50 Angstroms.

Figure 2:
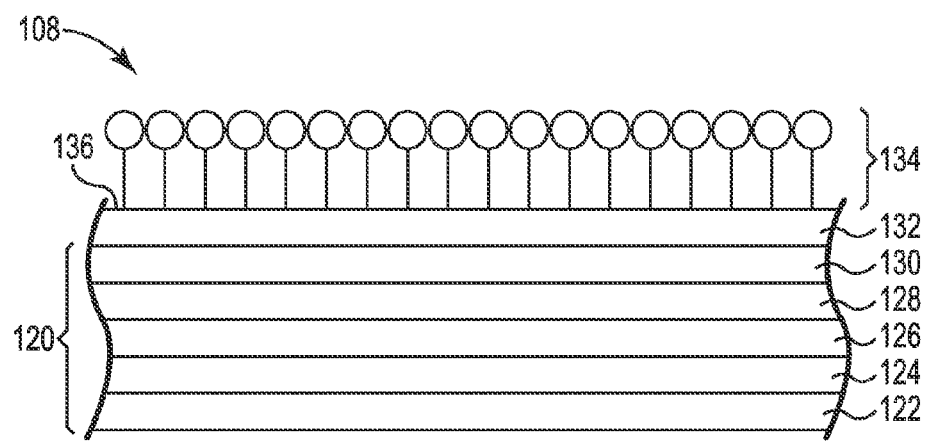
FIG. 2 is a schematic, side view of a magnetic storage medium.

FIG. 2 is a simplified side view diagram of an exemplary magnetic storage medium 108. For purposes of illustration, magnetic storage medium 108 is a perpendicular recording medium, although the medium may be any other type of magnetic recording medium, such as, for example, a longitudinal recording medium, a heat-assisted magnetic recording (HAMR) medium, a wire assisted magnetic recording (WAMR) medium, or the like. Magnetic storage medium 108 includes a magnetic substrate 120, which, in this embodiment of FIG. 2, includes a base 122, a soft underlayer (SUL) 124, a first interlayer 126, a second interlayer 128, and a magnetic recording layer 130. Present on magnetic substrate 120 is a protective overcoat 132 (e.g., a protective carbon overcoat) and a self-assembled monolayer (SAM) 134 covalently bound to carbon atoms adjacent an upper surface 136 of protective overcoat 132. In other embodiments, when no protective overcoat 132 is present, SAM 134 is covalently bound to the surface of magnetic recording layer 130. SAM 134 may have a thickness between approximately 1 Angstrom and 20 Angstroms, but may be thinner or thicker depending on the chemistry used for the self-assembled monolayer. SAM 134 may be present on the entire advanced air bearing (AAB) surface, on the entire air bearing surface (ABS) or rails, or only on a portion of the AAB or the ABS.

The terms "self-assembled monolayer" and "SAM" as used herein refer to a thin monolayer coating wherein surface-active molecules present in a reaction solution are provided (e.g., adsorbed) on a surface to produce chemical bonds therebetween. The SAM coatings, for this disclosure, have a magnetic function, for example, magnetic moment, coercivity, anisotropy, and/or magnetic coupling. The self-assembled monolayer can be, for example, an organosilane (e.g. alkyl trichlorosilane, fluorinated alkyl trichlorosilane, alkyl trialkyloxysilane, fluorinated alkyl trialkyloxysilane, etc.) that includes a magnetic function. The magnetic function may be provided by any material that has a magnetic function. Generally, self-assembled monolayer (SAM) materials with magnetic moments that are higher can be better than SAM materials with magnetic moments that are lower. In some embodiments, the magnetic moment of the SAM is at least 0.1 Tesla, in other embodiments at least 0.2 Tesla, and in further embodiments at least 0.5 Tesla. Additional details regarding the self-assembled monolayer (SAM) materials are provided below.

Base 122 may include any material that is suitable to be used in magnetic recording media, including, for example, Al, NiP plated Al, glass, ceramic glass, or the like. Although not shown in FIG. 2, in some embodiments, at least one additional underlayer may be present in magnetic substrate 120, for example, immediately on top of base 122. Soft underlayer (SUL) 124 may be any soft magnetic material with sufficient saturation magnetization ($B_S$) and low anisotropy ($H_k$). For example, SUL 124 may be an amorphous soft magnetic material such as Ni; Co; Fe; an Fe-containing alloy such as NiFe (Permalloy), FeSiAl, FeSiAlN, or the like; a Co-containing alloy such as CoZr, CoZrCr, CoZrNb, or the like; or a CoFe-containing alloy such as CoFeZrNb, CoFe, FeCoB, FeCoC, or the like. First interlayer 126 and second interlayer 128 may be used to establish an HCP (hexagonal close packed) crystalline orientation that induces HCP (0002) growth of magnetic recording layer 130, with a magnetic easy axis perpendicular to the plane of magnetic storage medium 108. Magnetic recording layer 130 may include Co alloys. For example, the Co alloy may include Co in combination with at least one of Cr, Ni, Pt, Ta, B, Nb, O, Ti, Si, Mo, Cu, Ag, Ge, or Fe. Magnetic recording layer 130 may also include a Fe—Pt alloy, a Sm—Co alloy, or the like. In some embodiments, magnetic recording layer 130 may include a non-magnetic oxide, such as $SiO_2$, $TiO_2$, CoO, $Cr_2O_3$, $Ta_2O_5$, or the like, which separates the magnetic grains. Protective overcoat 132 maybe present on magnetic substrate 120. As indicated above, protective overcoat 132 may be, for example, diamond-like carbon (DLC) or an amorphous carbon layer.

In some embodiments, not illustrated however, a lubricant layer may be deposited on protective overcoat 132 between overcoat 132 and SAM 134. A lubricant layer decreases the coefficient of friction between medium 108 and slider 112 and is well known. For embodiments where a lubricant is present, SAM 134 would be bound to the lubricant layer.

Figure 3:
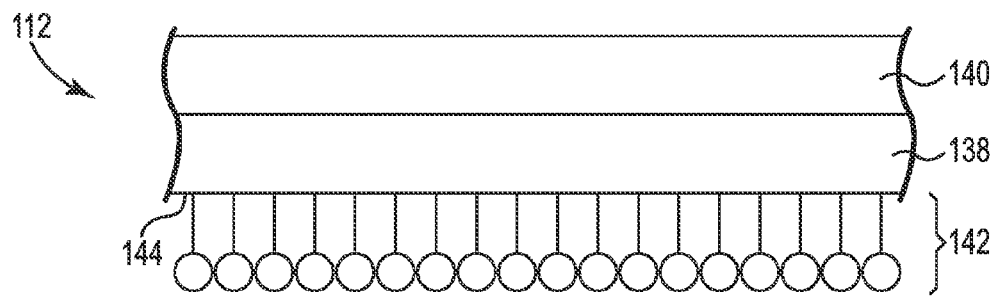
FIG. 3 is a schematic, side view of a head or slider.

FIG. 3 is a simplified side view diagram of an exemplary slider 112. Slider 112 has a base substrate 140 having a protective layer 138 (e.g., a protective carbon overcoat) that defines lower surface 144. Protective overcoat 138 may form a surface of at least an advanced air bearing (AAB) of slider 112. Protective overcoat 138 may be, for example, diamond-like carbon (DLC) or an amorphous carbon layer. In some embodiments, lower surface 144 of protective overcoat 138 may comprise a {100} crystal plane. In other embodiments, lower surface 144 may comprise another crystal plane. Carbon atoms adjacent lower surface 144 of protective overcoat 138 may be covalently bound to respective molecules of a self-assembled monolayer (SAM) 142.

In some embodiments, not illustrated however, a lubricant layer may be deposited on carbon protective overcoat 138 between overcoat 138 and SAM 142. A lubricant layer decreases the coefficient of friction between medium 108 and slider 112 and is well known. For embodiments where a lubricant is present, SAM 142 would be bound to the lubricant layer.

Second SAM 142 is typically the same as or similar to SAM 134. Second SAM 142 may include the same chemical species (atom or molecule) as first SAM 134. In other embodiments, second SAM 142 may include a different species (atom or molecule) than first SAM 134.

Figure 4A:
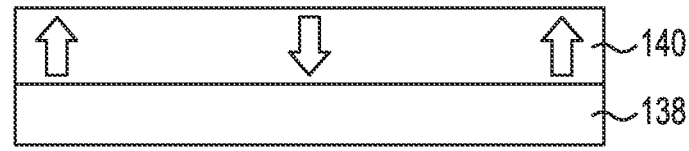
FIG. 4A is a schematic, side view of a magnetic storage medium and a head or slider, with neither the medium nor the slider having a self-assembled monolayer thereon.
Figure 4A:
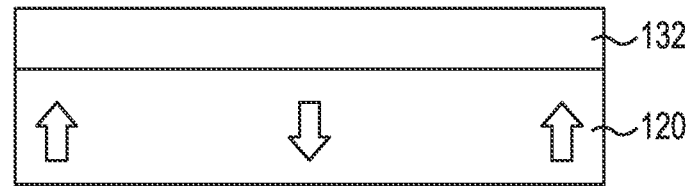
Figure 4B:
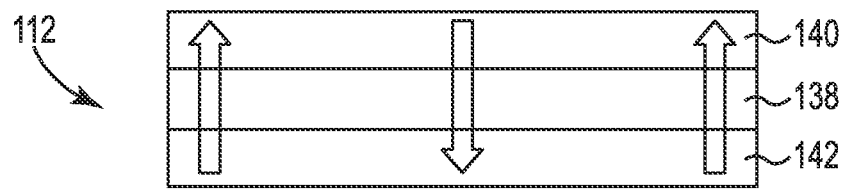
FIG. 4B is a schematic, side view of a magnetic storage medium magnetically engaged with a head or slider, both the medium and the slider having a self-assembled monolayer according to this disclosure.
Figure 4B:
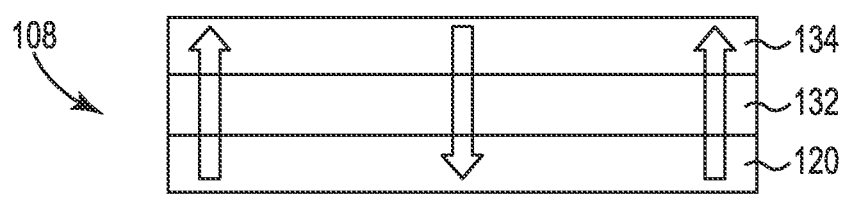

FIGS. 4A and 4B illustrate the benefits of having a magnetic SAM layer on either or both magnetic medium 108 or slider 112. In FIG. 4A, magnetic substrate 120 (such as magnetic substrate 120 of medium 108 from FIG. 2) is shown having protective overcoat 132 thereon. Similarly, base substrate 140 (such as base substrate 140 of slider 112 from FIG. 3) is shown having protective overcoat 138 thereon. Note there is no SAM layer present in this illustration.

The magnetic flux or magnetic field of magnetic substrate 120 and base substrate 140 are shown in FIG. 4A. In both magnetic substrate 120 and substrate 140, the magnetic flux or magnetic field, in general, begins to disperse through protective overcoat 132, 138. Because of the magnetic field dispersion, from magnetic substrate 120 and substrate 140, in order for the read head to accurately and efficiently read data from medium 108, the distance or "flying height" between slider 112 and magnetic medium 108 is low.

Conversely in FIG. 4B, magnetic medium 108 has magnetic substrate 120 (such as magnetic substrate 120 of medium 108 from FIG. 2) with protective overcoat 132 and SAM 134 thereon. Similarly, slider 112 has substrate 140 (such as substrate 140 of slider 112 from FIG. 3) with protective overcoat 138 and second SAM 142 thereon. The magnetic flux or magnetic field of magnetic substrate 120 and substrate 140 are shown in FIG. 4B, extending through protective overcoat 132, 138 and SAM 134, 142 with reduced dispersion.

To record information to magnetic storage medium 108 (FIG. 2), the recording transducer (write head) in slider 112 generates a magnetic field with a specific orientation, which induces a magnetic orientation in domains within magnetic recording layer 130 (FIG. 2). The magnetic component of SAM coatings 134, 142 reduces the dispersion of the magnetic field in the z-direction (normal to the plane of magnetic substrate 120 and base substrate 140) and act as a guide or channel for the magnetic field. The z-direction is also the head to media spacing (HMS) direction. Due to reduced magnetic field dispersion by SAM 134, 142, the transitions (magnetic bits) are better resolved with a higher signal-to-noise ratio (SNR) at an equivalent clearance compared to embodiments such as FIG. 4A where no SAM coating is present. Higher SNR between medium 108 and slider 112 improves performance/yield of magnetic disc drive 100.

Alternatively, because of the reduced magnetic dispersion, presence of SAM coatings 134, 142 provides for higher clearance schemes with acceptable SNR. This is desirable, as higher clearance provides for improved reliability and increased recording performance of magnetic disc drive 100.

As indicated, above, SAM 134 and SAM 142 are monolayer coatings having a magnetic function or quality that improves the magnetic fields and/or flux of magnetic medium 108 and slider 112 by reducing the dispersion of the magnetic fields from magnetic substrate 120 and base substrate 140. The magnetic function may be measured, for example, as magnetic moment. In some embodiments, the SAM has a magnetic moment of at least 0.1 Tesla.

SAM 134 may be deposited on upper surface 136 and/or SAM 142 may be deposited on lower surface 144 in a vacuum chamber using a plasma source, such as, for example, a radio-frequency inductive plasma source, a radio-frequency capacitive plasma source, a DC arc plasma source, a hollow cathode plasma source, microwave plasma source or an electron cyclotron resonance (ECR) plasma source, as described in further detail below with respect to FIGS. 5 and 6.

The precursor compound for forming the self-assembled monolayer or SAM contains molecules having a head group, a tail, and functional end group. Common head groups include thiols, silanes, phosphonates, etc. SAMs are created by chemisorption of the head groups onto the substrate material (i.e., in this application, onto magnetic substrate 120, protective overcoat 132, substrate 140, or protective overcoat 138) from either a vapor or liquid phase, by processes such as immersion or dip coating, spraying, chemical vapor deposition (CVD), micro-contact printing, dip-pen nanolithography, etc. The head groups closely assemble on the material with the tail groups extending away from the material. The self-assembled monolayer can be, for example, an organosilane (e.g. alkyl trichlorosilane, fluorinated alkyl trichlorosilane, alkyl trialkyloxysilane, fluorinated alkyl trialkyloxysilane, etc.).

If deposited from a liquid phase, the precursor compound of the SAM may be present in any conventionally-used organic solvent, water, or any mixture thereof. Examples of suitable organic solvents may include, but are not limited to, alcohols (e.g., methyl alcohol, ethyl alcohol, n-propyl alcohol, isopropyl alcohol, n-butyl alcohol, sec-butyl alcohol, t-butyl alcohol, isobutyl alcohol, and diacetone alcohol); ketones (e.g., acetone, methylethylketone, methylisobutylketone); glycols (e.g., ethyleneglycol, diethyleneglycol, triethyleneglycol, propyleneglycol, butyleneglycol, hexyleneglycol, 1,3-propanediol, 1,4-butanediol, 1,2,4-butantriol, 1,5-pentanediol, 1,2-hexanediol, 1,6-haxanediol); glycol ethers (e.g., ethyleneglycol dimethyl ether, and triethyleneglycol diethyl ether); glycol ether acetates (e.g., propylene glycol monomethyl ether acetate (PGMEA)); acetates (e.g., ethylacetate, butoxyethoxy ethyl acetate, butyl carbitol acetate (BCA), dihydroterpineol acetate (DHTA)); terpineols (e.g., trimethyl pentanediol monoisobutyrate (TEXANOL)); dichloroethene (DCE); chlorobenzene; and N-methyl-2-pyrrolidone (NMP).

The concentration of the precursor compound in the solution may be determined by those skilled in the art according to the intended applications and purposes and may be in the range of about 5 to about 20 mM, when taking into consideration the surface-modification level and the decrease in contact resistance of the gate insulating layer 40 and the source/ drain electrodes 50 and 60. An immersion step may be performed without particular limitation and may be carried out at room temperature for about 20 to 80 minutes. Similarly, other methods may be carried out by conventional means.

The precursor compound for forming the self-assembled monolayer is selected so that the resulting SAM has the desired magnetic guiding properties. The SAM material promotes passages of magnetic flux through the SAM material, by having a magnetic function such as magnetic moment. Such SAM materials may include a metallocene, such as ferrocene, or any other ferromagnetic material. Combination of two or more SAM materials may be used, at least one of which has the desired magnetic properties. A particular example of a SAM with magnetic guiding properties is a ferrocene-terminated thiol, such as ferrocene alkane thiol. Ruthenium-terminated self-assembly monolayer materials may additionally have the desired magnetic guiding properties. Of course, other magnetic SAM materials could be used.

Figure 5:
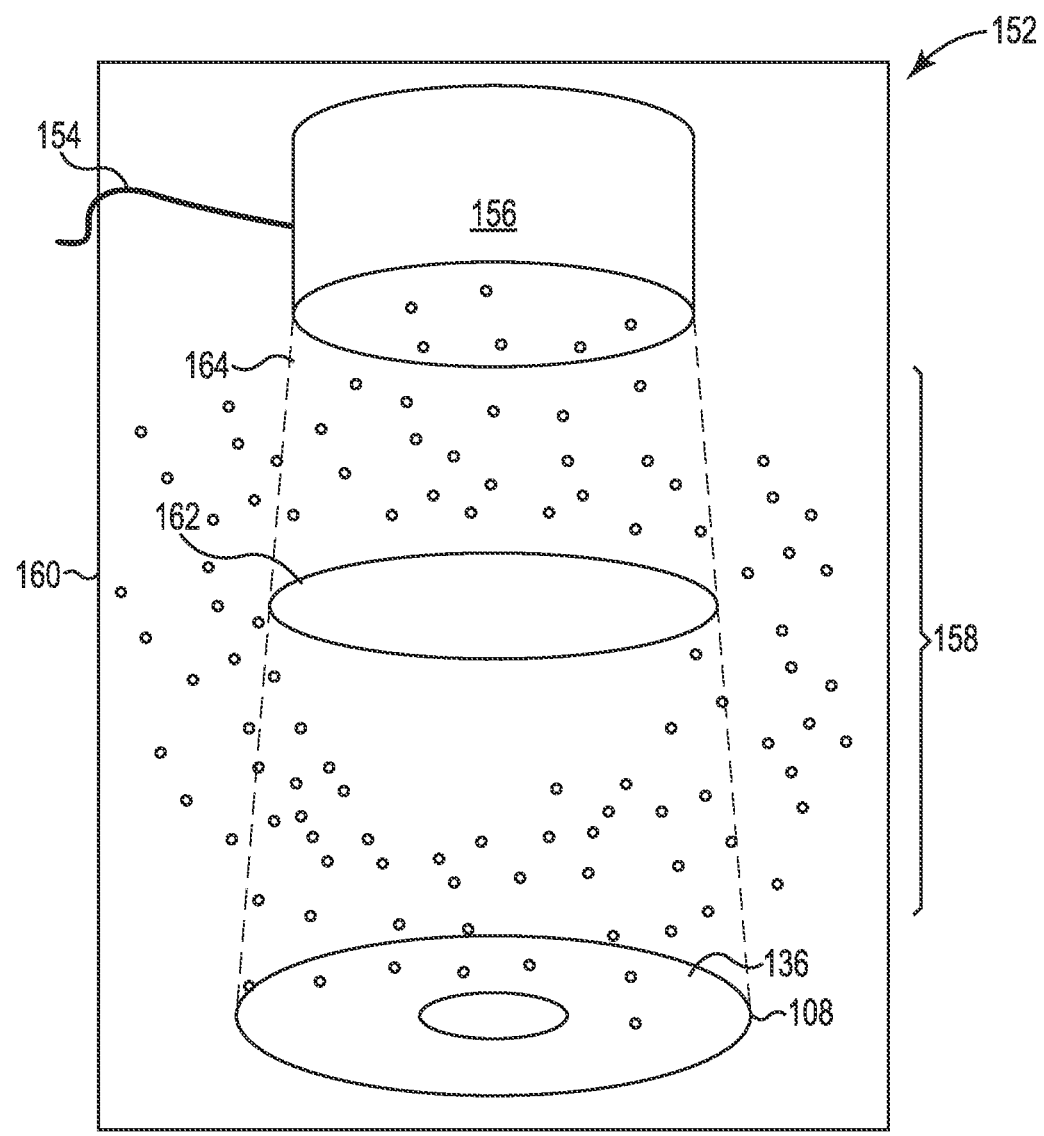
FIG. 5 is a schematic diagram of an example system for depositing a self-assembled monolayer on a surface of a magnetic storage medium.
Figure 6:
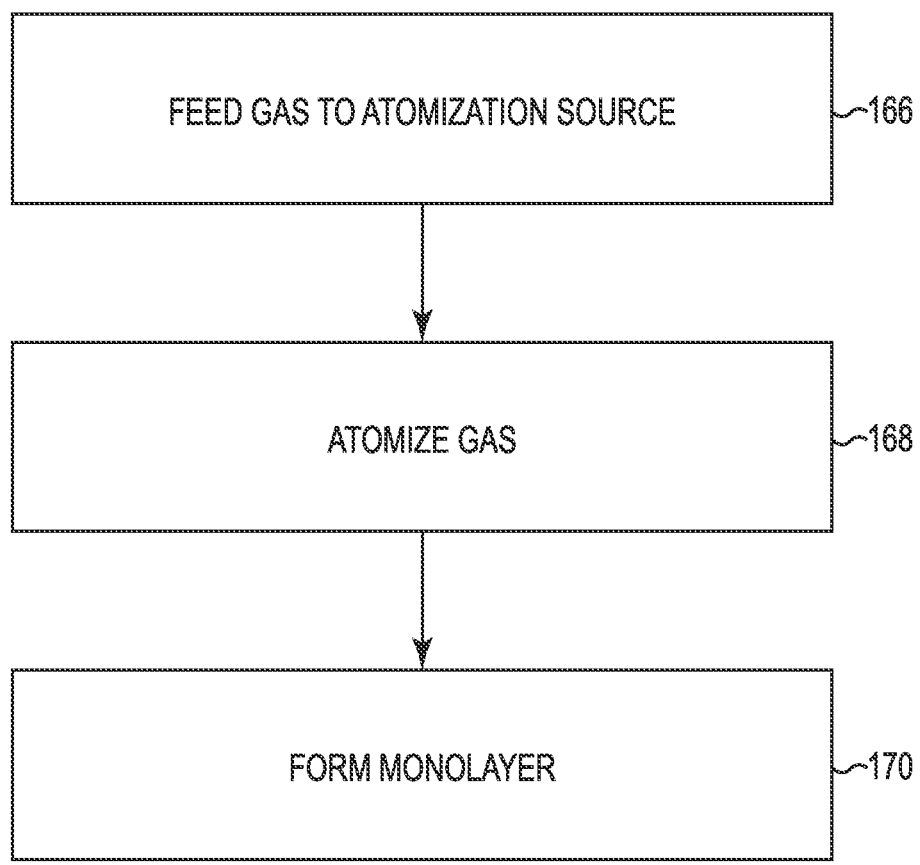
FIG. 6 is a flowchart illustrating an example process for depositing a self-assembled monolayer on a surface of a magnetic storage medium.

Turning to FIGS. 5 and 6, for purposes of illustration, FIG. 5 will be described with concurrent reference to FIG. 6, which is a flowchart illustrating an example process for depositing a SAM onto a surface of a magnetic storage medium or a slider.

A deposition system 152, illustrated in FIG. 5, includes a vacuum chamber 160, an ionization source 156, and a gas input line 154. Positioned within vacuum chamber 160 is a magnetic storage medium 108, which may be similar to magnetic storage medium 108 described with respect to FIG. 2. Deposition system 152 optionally includes a shield 162. In some embodiments, vacuum chamber 160 may be contiguous with or connected to a chamber in which protective overcoat 132 is deposited on magnetic recording layer 130, in order to reduce or minimize contamination of upper surface 136 with unwanted chemical species. Vacuum chamber 160, and more particularly magnetic storage medium 108, may be maintained at or near room temperature (e.g., approximately 25° C.) to encourage proper surface chemistry.

As shown in FIG. 5, during the deposition process, an input gas is fed (e.g., injected) into an ionization source 156 (step 166 in FIG. 6) in vacuum chamber 160 via gas input line 154. Ionization source 156 produces ions 158 (step 168 in FIG. 6), which are the species that form SAM 134 (step 170 in FIG. 6). Ionization source 156 may comprise, for example, a radio-frequency inductive plasma source, a radio-frequency capacitive plasma source, a DC arc plasma source, a hollow cathode plasma source, microwave plasma source or an electron cyclotron resonance (ECR) plasma source. The beam current of ionization source 156 may be between approximately 10 milliamps (mA) and approximately 100 (mA) and the beam voltage may be between approximately 100 electron volts (eV) and approximately 2,000 eV. The particular beam current and beam voltage may be selected to increase formation of the desired atoms 158 and/or reduce formation of unwanted species.

The input gas, from line 154, may include a species to be covalently bound to upper surface 136 of magnetic storage medium 108, e.g., $F_2$, $H_2$, $N_2$, $O_2$, a fluoro-organic molecule, or the like. Additionally or alternately, the input gas may include a carrier gas, such as, for example, He or Ar. The input gas may be at a low pressure, e.g., on the order of milliTorrs, and may have a flow rate of between approximately 1 standard cubic centimeter per minute (SCCM) and approximately 10 SCCM. The precise pressure and flow rate of the input gas may be selected to produce the desired coverage of upper surface 136 by SAM 134 (FIG. 2) and to minimize the implantation of the species forming SAM 134 in protective overcoat 132. The operating parameter may also depend on the type of plasma source (e.g., a radio-frequency inductive plasma source, a radio-frequency capacitive plasma source, a DC arc plasma source, a hollow cathode plasma source, microwave plasma source or an electron cyclotron resonance (ECR) plasma source) and the geometry of the source.

In some embodiments, shield 162, which may be a thin metal plate, is placed between ionization source 156 and magnetic storage medium 108 to block direct bombardment of protective overcoat 132 by ions 158. This may reduce the momentum with which ions 158 approach overcoat 132, and reduces or substantially eliminate implantation of ions 158 in protective overcoat 132. The size and position of shield 162 may depend on the size and position of ionization source 156 relative to magnetic storage medium 108. In some embodiments, the size and position of shield 162 may be selected such that when viewed from a point on upper surface 136 of magnetic storage medium 108, a solid angle 164 of ionization source 156 is covered. Additionally or alternatively, the flow rate and pressure of the input gas may be selected such that ions 158 formed by the ionization source 156 approach upper surface 136 with low momentum (i.e., velocity), which may minimize implantation of the ions 158 in protective overcoat 132.

Ions 158 approach upper surface 136 of magnetic storage medium 108 and covalently bond to carbon atoms adjacent upper surface 136 to form SAM 134. Ions 158 preferably approach upper surface 136 at a low velocity (with little momentum) to reduce the probability of implantation of ions 158 in magnetic storage medium 108 or damage to upper surface 136 and increase the probability that ions 158 will react with carbon atoms adjacent upper surface 136 to form covalently bound SAM 134. In some embodiments, ionization source 156 is fed sufficient input gas to form sufficient ions 158 to substantially fully cover upper surface 136, i.e., substantially every carbon atom adjacent upper surface is bound to an atom or molecule of SAM 134.

In such a manner, a self-assembled monolayer or SAM can be applied to a magnetic medium and/or slider. The magnetic SAM has a magnetic function or quality that improves the magnetic fields and/or flux of the magnetic medium and/or the slider by directing or channeling the magnetic fields from the magnetic substrate, thus reducing the dispersion of the magnetic field.

Thus, embodiments of the DISC DRIVE WITH MAGNETIC SELF-ASSEMBLED MONOLAYER are disclosed. The implementations described above and other implementations are within the scope of the following claims. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A magnetic data storage drive comprising:
  a magnetic data storage medium having a magnetic surface;
  a slider having a working surface, the slider positioned and configured to detect magnetic fields from the magnetic surface of the medium; and
  a self-assembled monolayer between the magnetic surface and the working surface, the self-assembled monolayer having a magnetic function to reduce dispersion of magnetic fields from the magnetic surface of the medium to the working surface of the slider.

2. The data storage drive of claim 1 wherein the self-assembled monolayer is on the storage medium.

3. The data storage drive of claim 2 further comprising a protective overcoat between the magnetic surface of the storage medium and the self-assembled monolayer.

4. The data storage drive of claim 3 wherein the protective overcoat comprises diamond-like carbon (DLC).

5. The data storage drive of claim 2 wherein the self-assembled monolayer comprises ferrocene.

6. The data storage drive of claim 1 wherein the self-assembled monolayer is on the slider.

7. The data storage drive of claim 6 further comprising a protective overcoat between the working surface of the slider and the self-assembled monolayer.

8. The data storage drive of claim 7 wherein the protective overcoat comprises diamond-like carbon (DLC).

9. The data storage drive of claim 6 wherein the self-assembled monolayer comprises ferrocene.

10. The data storage drive of claim 1 wherein the self-assembled monolayer is on the storage medium, the drive further comprising a second self-assembled monolayer on the slider, the second self-assembled monolayer having a magnetic function to reduce dispersion of magnetic fields from the magnetic surface of the medium to the working surface of the slider.

11. The data storage drive of claim 10 wherein the self-assembled monolayer and the second self-assembled monolayer each comprises ferrocene.

12. The data storage drive of claim 10 further comprising a first protective overcoat between the magnetic surface of the storage medium and the self-assembled monolayer, and a second protective overcoat between the working surface of the slider and the second self-assembled monolayer.

13. The data storage drive of claim 12 wherein the first protective overcoat and the second protective overcoat comprise diamond-like carbon (DLC).

14. A magnetic data storage drive comprising:
   a magnetic data storage medium having a magnetic flux of at least 0.1 Tesla, the medium comprising:
      a magnetic surface;
      a protective overcoat present on the magnetic surface; and
      a self-assembled monolayer comprising a ferrocene on the protective overcoat; and
   a slider having a magnetic flux of at least 0.1 Tesla, the slider comprising:
      a working surface;
      a second protective overcoat present on the working surface; and
      a second self-assembled monolayer comprising a ferrocene on the second protective overcoat.

15. The data storage drive of claim 14 wherein the first protective overcoat and the second protective overcoat comprise diamond-like carbon (DLC).

16. A system comprising:
   a slider having a magnetic flux of at least 0.1 Tesla, the slider comprising a magnetic write transducer having an air bearing surface (ABS) and a self-assembled monolayer coating on the transducer; and
   magnetic media having a magnetic flux of at least 0.1 Tesla, the media comprising a second self-assembled monolayer coating.

17. The system of claim 16 wherein the self-assembled monolayer coating and the second self-assembled monolayer coating comprise ferrocene.

* * * * *